United States Patent [19]

Barbaric

[11] Patent Number: 5,365,565
[45] Date of Patent: Nov. 15, 1994

[54] APPARATUS AND METHOD FOR OBTAINING ANALOG AND COMPUTER PROJECTION RADIOGRAPHS FROM COMPUTER TOMOGRAPHIC SCANNERS

[75] Inventor: Zoran L. Barbaric, Malibu, Calif.

[73] Assignee: The Regents of the University of California, Oakland, Calif.

[21] Appl. No.: 198,703

[22] Filed: Feb. 18, 1994

[51] Int. Cl.$^5$ .............................................. G21K 5/10
[52] U.S. Cl. ...................................... 378/146; 378/4; 378/177; 250/359.1; 250/360.1
[58] Field of Search ............... 378/146, 169, 170, 177, 378/180, 181, 184, 186, 208, 209, 147, 154, 167, 4, 10, 11, 20, 21, 28, 63, 62; 250/259.1, 360.1, 484.4, 583, 589, 582

[56] References Cited

U.S. PATENT DOCUMENTS 5,166,968 11/1992 Morse .................................. 378/177
5,199,060 3/1993 Kato .................................... 378/208

Primary Examiner—David P. Porta
Assistant Examiner—Don Wong
Attorney, Agent, or Firm—Daniel L. Dawes

[57] ABSTRACT

A computer tomography (CT) scanner may be retrofitted or redesigned to integrally include an analog X-ray detector which allows the CT scanner to be used to provide both high spatial resolution analog projection radiographs and high contrast resolution CT images. A cassette carrier having a curved slot defined therein is provided for placement on or in the moveable tabletop of the CT scanner. The patient is then placed upon or above the cassette carrier. A flexible cassette is then disposed within the curved cassette and assumes the radius of curvature defined by the slot. The radius of curvature is chosen such that the film cassette is focused on a collimated X-ray source within the CT scanner. The curved cassette includes or may be combined with a flexible X-ray grid placed proximate to adjacent the X-ray film. The film cassette includes a phosphor plate and photosensitive film plate held in immediate contact with phosphor plate by which the analog projection radiograph is recorded. In this manner, the procedures of analog radiography and advantages thereof may be derived using existing computer tomography equipment.

20 Claims, 2 Drawing Sheets

APPARATUS AND METHOD FOR OBTAINING ANALOG AND COMPUTER PROJECTION RADIOGRAPHS FROM COMPUTER TOMOGRAPHIC SCANNERS

BACKGROUND OF THE INVENTION

1. Field of the Invention

The invention relates to the field of X-ray imaging equipment for producing a projection image on radiographic film or a reusable phosphor plate in combination with the moving tabletop of a computer tomography X-ray scanner.

2. Description of the Prior Art

Analog radiography is a method by which projection X-ray images of the human body or other object are recorded on X-ray film or some other photosensitive surface. Analog radiology is known to provide excellent spatial resolution, but poor contrast resolution.

Computerized radiography is a method by which projection X-ray images the human body or other objects are obtained by recording a latent image on a storage reusable phosphor plate which is then read under computer control by an interrogating light beam. The phosphor emits light of another wavelength which is proportional to the intensity of the X-ray. The emitted signal is digitized and displayed on a cathode ray tube monitor or laser printed on film or other media. Computerized radiography provides moderate spatial resolution and moderate contrast resolution which is improved over the contrast resolution realized by analog radiography.

Computer tomography is a method by which the cross sectional images of a human body or other objects is obtained by rotating an X-ray tube and an opposing array of X-ray detectors about the human body or object. The collimated X-ray beam fans out laterally while it is narrowly collimated along its longitudinal axis. Computer tomography provides poor spatial resolution, but excellent contrast resolution.

A very crude, low resolution projection image may also be obtained in a computer tomographic scanner by moving the object or human body through a collimated fanned beam and detector array. This is obtained by providing linearly moving the patient or object on a motorized tabletop on through a stationary collimated fan beam.

Conventional slot analog radiography is also known. The procedure is to expose the patient with a collimated fan X-ray beam. Behind the patient is an X-ray barrier with a conforming slot defined through it. The collimated beam and its slotted barrier are moved in unison down the length of the patient as the patient stands between the two. Positioned behind the slotted X-ray barrier is a stationary film plate. The film plate is fixed relative to the patient and receives the projection X-ray image from the patient as the slotted barrier moves across it. The results are comparable to analog radiography, the only difference being that the patient is sequentially exposed to a collimated beam of X-rays as opposed to having an entire area simultaneously exposed to a shaped beam. The contrasting resolution obtainable by conventional slot radiography remains poor although the spatial resolution of the projection radiographs are good.

Analog radiography and computerized radiography use traditional radiographic equipment whose fundamental technology has been substantially unchanged over the last 100 years. Computer tomography employs a radically different geometric design comprised of a gantry and motorized tabletop. In most if not all fully equipped radiology clinics and hospitals, one set of equipment is provided to produce high spatial resolution radiographs and another set of equipment to produce high contrast resolution axial radiographs. Hundreds of thousands of such units of each kind are used throughout the world. The cost of each of these units is substantial and currently both types of units are required to fully meet current standards of radiological practice.

Therefore, what is needed is a single apparatus and methodology or some means by which existing radiographic equipment can be modified or used which would provide both the excellent spatial resolution of analog radiography while at the same time providing the high contrast resolution of computer tomography without the need to provide expensive duplicate sets of radiographic instrumentation.

BRIEF SUMMARY OF THE INVENTION

The invention is an apparatus for providing an analog radiograph of a patient. The apparatus comprises a fixed collimated X-ray source and an analog X-ray detecting assembly disposed immediately behind the patient for detecting projection X-ray images of the patient from the X-ray source. A mechanism is provided for moving the assembly in unison with the patient while the patient is being exposed to X-rays from the X-ray source. As a result, the analog radiograph is provided with high spatial resolution and contrast resolution. The collimated X-ray source is part of a computer tomography scanner.

The mechanism for moving the assembly and patient in unison comprises a moveable tabletop upon which the patient is disposed and with respect to which the assembly is fixed. The moveable tabletop moves the assembly and patient past the fixed collimated X-ray source.

The assembly comprises a rigid curved cassette carrier and a flexible film cassette disposed in the cassette carrier. The cassette carrier conforms the flexible film cassette to a predetermined curvature in order to minimize lateral magnification of the analog radiograph.

The assembly further comprises a flexible X-ray grid. The flexible X-ray grid is disposed in the rigid cassette carrier and is conformed to the predetermined radius of curvature by the cassette carrier. The flexible X-ray grid may also be disposed in the flexible film cassette.

In a retrofitted version of the invention the assembly is disposed on the mechanism for moving the patient. In an original-equipment-manufacturer (OEM) version the assembly is integrally combined in the mechanism for moving the patient.

The invention can also be characterized as an improvement in a CT scanner having a moveable tabletop and a collimated X-ray source. The tabletop linearly moves the patient past the collimated X-ray source. The improvement comprises a curved analog X-ray detector for providing a record of a projection X-ray from the patient. An X-ray grid is disposed between the detector and the patient. The X-ray grid is fixed relative to the X-ray detector and patient so that the grid, detector and patient are moved in unison within the CT scanner by the moveable tabletop past the collimated X-ray source.

As a result, an analog radiograph is produced with high spatial resolution and high contrast resolution.

The invention is still further characterized as a method of providing a high spatial resolution and high contrast resolution analog projection radiograph comprising the steps of providing an X-ray grid and analog film X-ray detector at a relatively fixed position behind a patient. A collimated X-ray source is provided on a side of the patient opposing the X-ray grid and detector. The grid and detector simultaneously move in unison with the patient past the X-ray collimated source so that a high resolution analog radiograph is defined in the detector.

The invention may be better visualized by turning to the following drawings wherein like elements are referenced by like numerals.

The invention and its various embodiments can now be understood by turning to the following detailed description.

DETAILED DESCRIPTION OF THE PREFERRED EMBODIMENTS

A computer tomography (CT) scanner may be retrofitted or redesigned to integrally include an analog X-ray detector which allows the CT scanner to be used to provide both high spatial resolution analog projection radiographs and high contrast resolution CT images. A cassette carrier having a curved slot defined therein is provided for placement on or in the moveable tabletop of the CT scanner. The patient is then placed upon or above the cassette carrier. A flexible cassette is then disposed within the curved cassette and assumes the radius of curvature defined by the slot. The radius of curvature is chosen such that the film cassette is focused on a collimated X-ray source within the CT scanner. The curved cassette includes or may be combined with a flexible X-ray grid placed proximate to adjacent the X-ray film. The film cassette includes a phosphor plate and photosensitive film plate held in immediate contact with phosphor plate by which the analog projection radiograph is recorded. In this manner, the procedures of analog radiography and advantages thereof may be derived using existing computer tomography equipment.

Figure 1:
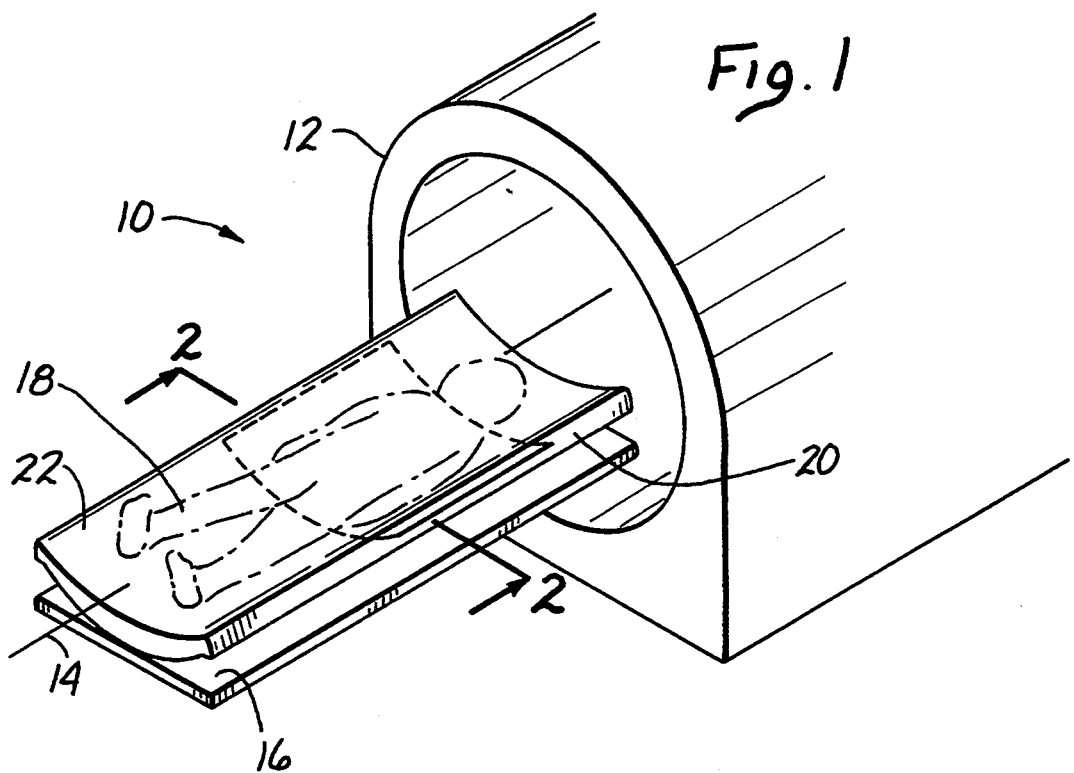
FIG. 1 is an idealized perspective view of a computer tomography scanner incorporating the improvement of the invention.

FIG. 1 is a perspective view of a computer tomography scanner, generally denoted by reference numeral 10, which has either been retrofitted by or modified to incorporate the invention. Scanner 10 is comprised of a circular gantry 12 in which a moveable conventional X-ray source and array of X-ray detectors are rotated about a central axis 14 of scanner 10. The patient 18 or object to be X-rayed is placed upon a moveable tabletop 16 which is then translated along longitudinal axis 14 in order to position patient 18 sequentially within a collimated fan-shaped X-ray beam which in this application is held stationary above axis 14. The means by which the X-ray source is provided and its computer tomographic detectors is conventional and largely immaterial to the subject of the invention. Therefore, details concerning CT scanner 10 will not be further described. It must be understood that all features of conventional computer tomographic scanners 10, now known or later discovered, are contemplated as being used in combination with the invention.

Figure 4:
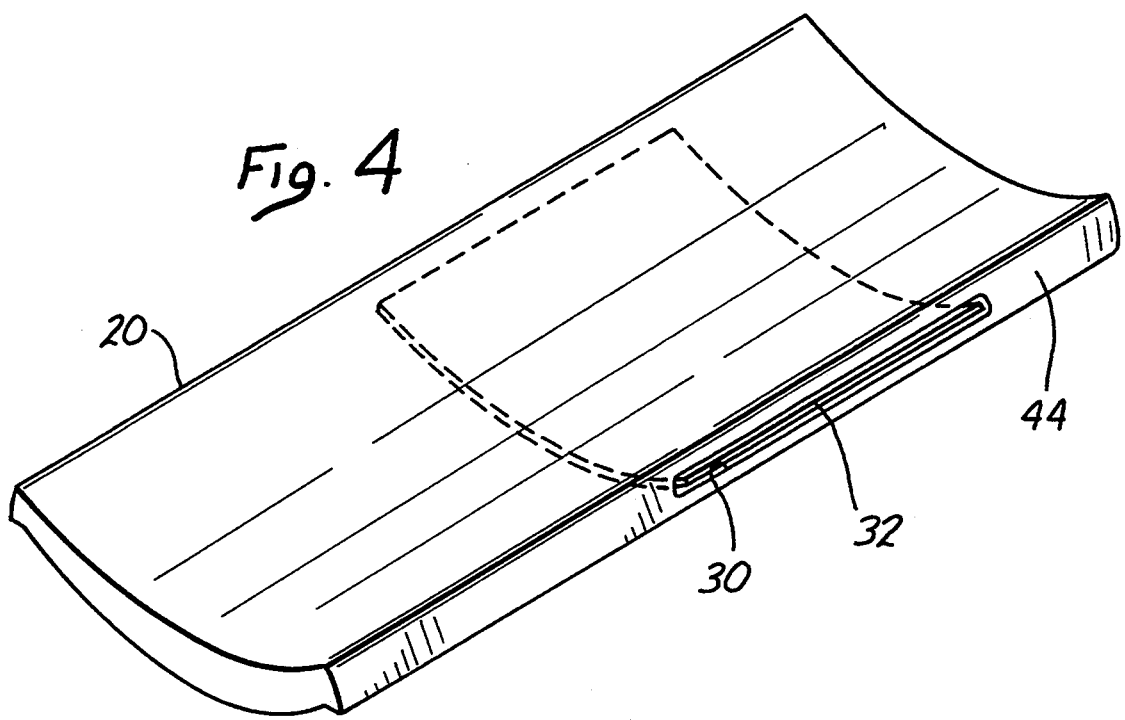
FIG. 4 is a perspective view of the film cassette carrier as used in a retrofitted embodiment of the invention.
Figure 3:
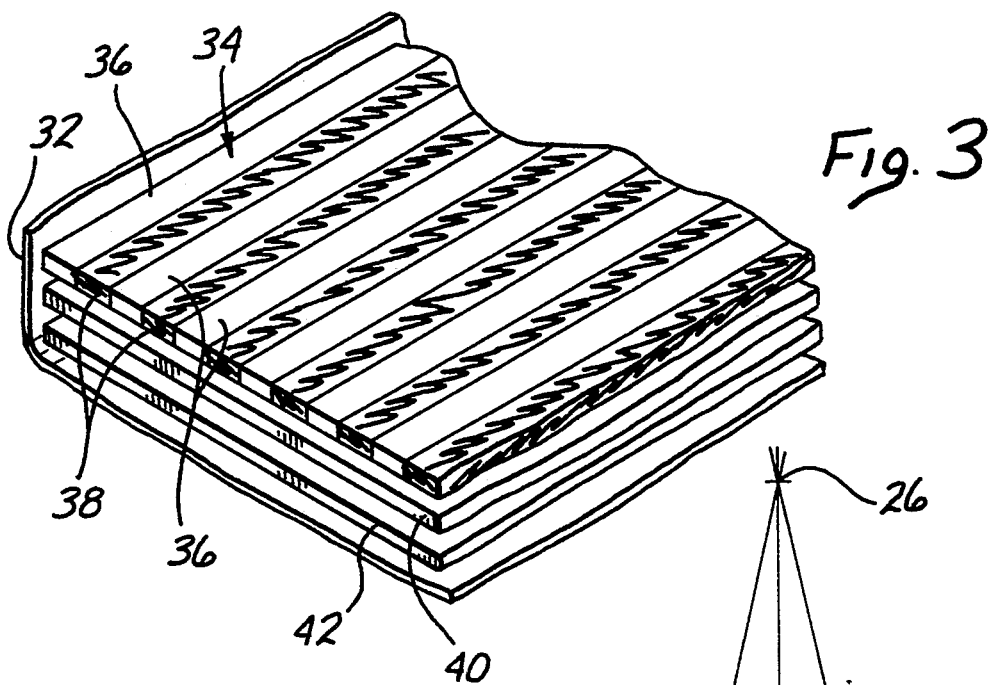
FIG. 3 is a simplified cutaway perspective view of a film cassette carrier, film cassette and grid as used in combination in the invention.
Figure 2:
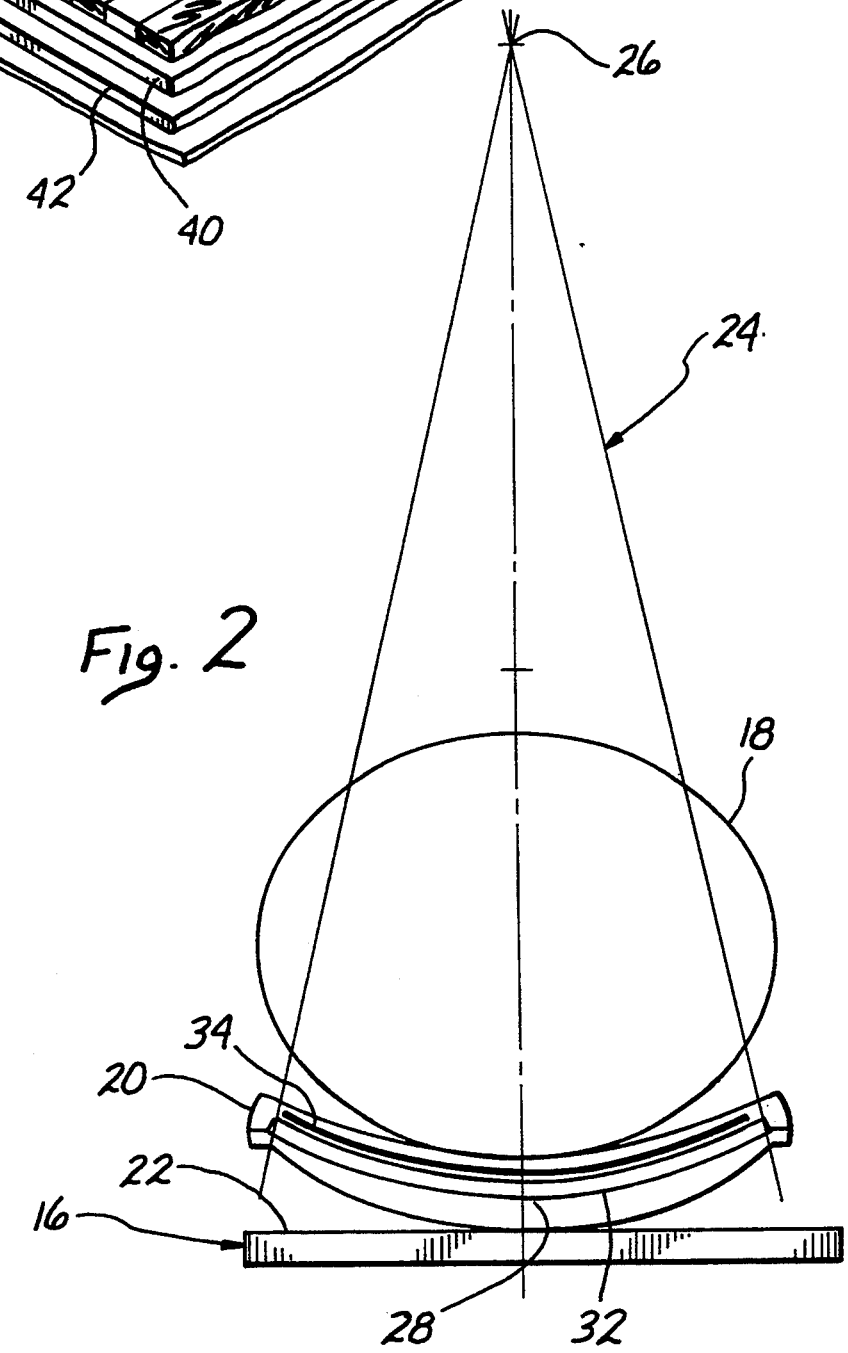
FIG. 2 is a diagrammatic cross-sectional view of the computer tomography scanner taken through section lines 2—2 of FIG. 1.

A radiographic cassette carrier 20, to be described below in greater detail in connection with FIGS. 2-4, is disposed beneath patient 18. In the retrofitted embodiment, carrier 20 is a separate piece which is simply placed upon the top surface 22 of tabletop 16 and upon which patient 18 then lies. In an original equipment manufactured embodiment, cassette carrier 20, is integrally built into or is part of tabletop 16.

A simplified cross sectional view of the invention is depicted in FIG. 2 in enlarged scale as seen through section lines 2—2 of FIG. 1, assuming the embodiment of FIG. 1 to be the retrofitted version. It must be understood that modifications to tabletop 16 and cassette carrier 20, consistent with the teachings of present invention, would be made in order to realize an integrated OEM version.

A collimated fan-shaped X-ray beam, denoted by reference numeral 24, is focused through an x-ray focal spot 26 above patient 18 and fans out across patient 18 and curved cassette carrier 20 placed underneath patient 18. In one embodiment, a computer tomography scanner 10, manufactured as Model G980 by General Electric, utilizes a moveable table 16 having a curved tabletop surface 22 with a 15 inch radius of curvature. Generally, the radius of curvature of existing tabletop surfaces 22 are designed without any relationship to the X-ray imaging since they are meant only to provide an ergonomic surface for a patient 18 and not a focal plane for a detecting film plate. In a conventional CT scanner 10, gantry structure 12 provides the necessary geometry for focusing of the source on detectors across the ring and not on tabletop surface 22.

Therefore, to avoid lateral distortion of the projection image, cassette carrier 20 has a slot defined therein as described in greater detail in connection FIG. 4 so that the flexible cassette described in connection with FIG. 3 is curved by amount sufficient to allow equidistant positioning at each point on the film from x-ray focal spot 26 in scanner 10. In the example of the Model G980 General Electric CT scanner, table surface 22 happens to have a radius of curvature of approximately 40 centimeters, whereas the distance to focal spot 26 at film plane 28, is approximately 80 centimeters. Therefore, slot 30 in FIG. 4 defined in cassette carrier 20 is defined to be have an 80 centimeter radius of curvature.

As shown in FIG. 2, cassette carrier 20 has disposed therein a curved or flexible film cassette 32 behind a flexible X-ray grid 34. X-ray grid 34 is shown in greater detail in FIG. 3 and is a conventional X-ray grid having a plurality of longitudinal elements of at least two different nuclear masses or atomic numbers, Z. For example, in the illustrated embodiment, elements 36 may be comprised of a low Z material such as aluminum or plastic, while the interlying alternating elements 38 are comprised of lead. The configuration and detailed structure of grid 34 is well known to the art and it is expressly understood that any technological refinements now known or later discovered with respect to X-ray grids can be used in combination with the invention. For example, appropriate edge shaping of elements 36 and 38, dimensioning the choice of composition, are all included within the present contemplation when choosing an appropriate X-ray grid according to conventional teachings. In the illustrated embodiment a grid with sharp edged laminations is preferred. X-ray grid 34 is used to improve the X-ray projection image from scattering of the collimated beam within patient 18.

Disposed beneath X-ray grid 13 is a flexible film cassette 32 is a phosphor screen 40. Beneath or behind phosphor screen 40 is photographic film plate 42. Grid 36, screen 40 and film plate 42 are all flexible and disposed within a flexible light-tight film cassette 32 shown in cutaway view in FIG. 3. Again, the precise construction and organization of film cassette 32 is largely immaterial as long as it provides containment and relative positioning of grid 34, screen 40 and film plate 42 in the manner as taught here. In the illustrated embodiment, a standard cardboard cassette as manufactured by Kodak, utilizing a 1200 PAR film-screen combination and a honeycomb grid manufactured by Kodak, has been used and found suitable.

FIG. 4 is a perspective view of cassette carrier 20 in which a slot 30 has been defined through a lateral side 44. The curvilinear volume of slot 30 is shown in dotted outline in the body of cassette 20 which is comprised of a low Z material such as wood or plastic. Foam cushioning may be added for patient comfort or better conformity with curved surface 22 if desired. In any case, at least slot 30 in cassette carrier is rigid so that when cassette 32 is disposed in slot 30, it is bent to conform to the appropriate curvature of the focal length of focal spot 26 in scanner 10 with which it is used.

Consider one illustration in which the embodiment of FIG. 4 has been used. Cassette holder 20 utilizing film/screen combinations of 400 and 800 PAR with photosensitive phosphor screen were used with and without a grid. A phantom of various portion of the human, such as the knee, skull, thorax and abdomen, were placed upon tabletop surface 22 above the analog receptor or film plate 42 included within cassette holder 32 in cassette carrier 20. The phantom receptor moved in unison through a collimated X-ray beam in a conventional CT scanner with the x-ray source fixed directly overhead in gantry 12. The collimated slot width varied from 1 millimeter to 2 millimeters in axial direction 14 using 80 and 120 kVp. The required milliamperes were computed from the table travel time, slot width and tube milliampere ratings.

Traditional analog projection radiographs of the same phantoms, using the same techniques, were compared with radiographs acquired utilizing the above CT slot radiography technique. Images obtained with flat cassettes demonstrated approximately 20 percent lateral magnification, with no magnification in the axial direction. Satisfactory images without lateral magnification were achieved with the flexible cassette described above in connection with FIGS. 1–4.

Maximum calculated milliamperes for the abdominal phantom was 20 mA at 80 kVp, which is less than necessary for traditional analog projection radiography. In the case of the chest phantom, using 2 milliamperes at 120 kVp, superior mediastinal contrast with slot radiography of the invention was obtained as compared to traditional analog projection radiographs.

The results of the study demonstrate that conventional CT scanners can function to provide both axial images as well as analog projectional radiographs. In many instances, the need of use of traditional analog X-ray equipment can be totally eliminated with a simple device affixed to the CT tabletop or by redesigning the tabletop to accommodate curved cassette carrier 20 of the invention.

In the case of the chest torso, spatial resolution of 3 line pairs per millimeter were easily obtainable as compared to maximum expected resolution without a phantom in analog film of approximately 6 line pairs per millimeter being achievable in the device utilized in the study. Contrast resolution obtained by the CT slot radiography of the invention were fully comparable to those produced by computer tomography.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptionally equivalent, and also what essentially incorporates the essential idea of the invention.

I claim:

1. An apparatus for providing an analog radiograph of a patient comprising:
   a fixed collimated X-ray source;
   an analog X-ray detecting assembly for detecting projection X-ray images of said patient from said X-ray source; and
   a mechanism for moving said assembly in unison with said patient while said patient is being exposed to X-rays from said X-ray source,
   whereby said analog radiograph is provided with high spatial resolution and contrast resolution.

2. The apparatus of claim 1 wherein said collimated X-ray source is part of a computer tomography scanner.

3. The apparatus of claim 1 wherein said mechanism for moving said assembly and patient in unison comprises a moveable tabletop upon which said patient is disposed and with respect to which said assembly is fixed, said moveable tabletop moving said assembly and patient past said fixed collimated X-ray source.

4. The apparatus of claim 3 wherein said collimated X-ray source is part of a computer tomography scanner.

5. The apparatus of claim 1 wherein said assembly comprises a rigid curved cassette carrier and a flexible film cassette disposed in said cassette carrier, said cassette carrier conforming said flexible film cassette to a predetermined curvature in order to minimize lateral magnification of said analog radiograph.

6. The apparatus of claim 5 wherein said assembly further comprises a flexible X-ray grid said flexible X-ray grid being disposed in said rigid cassette carrier and being conformed to said predetermined radius of curvature by said cassette carrier.

7. The apparatus of claim 1 wherein said assembly further comprises a flexible X-ray grid and a rigid cassette carrier, said flexible X-ray grid being disposed in said rigid cassette carrier and being conformed to a predetermined curvature by said cassette carrier.

8. The apparatus of claim 6 wherein said flexible X-ray grid is disposed in said flexible film cassette.

9. The apparatus of claim 1 wherein said assembly is disposed on said mechanism for moving said patient.

10. The apparatus of claim 1 wherein said assembly is integrally combined in said mechanism for moving said patient.

11. An improvement in a CT scanner having a moveable tabletop and a fixed collimated X-ray source, said tabletop for linearly moving said patient past said collimated X-ray source, said improvement comprising:
   a curved analog X-ray detector for providing a record of a projection X-ray from said patient; and
   an X-ray grid disposed between said detector and said patient, said X-ray grid fixed relative to said X-ray detector and patient so that said grid, detector and patient are moved in unison within said CT scanner by said moveable tabletop past said collimated X-ray source,
   whereby an analog radiograph is produced with high spatial resolution and high contrast resolution.

12. The improvement of claim 11 wherein said curved analog X-ray detector has a predetermined radius of curvature so that said detector is focused at said X-ray source.

13. The improvement of claim 12 wherein said curved detector comprises a rigid, curved cassette carrier and a flexible film disposed within said cassette carrier, said cassette carrier conforming said flexible film to said predetermined radius of curvature.

14. The improvement of claim 13 wherein said carrier is disposable on said moveable tabletop.

15. The improvement of claim 13 wherein said carrier is intregally disposed in said moveable tabletop.

16. The improvement of claim 11 wherein said X-ray grid is flexible and disposed in said carrier, said carrier conforming curvature of said X-ray grid with said predetermined radius of curvature.

17. The improvement of claim 16 wherein said flexible X-ray grid is disposed in said flexible film cassette and is conformed to said predetermined curvature by said carrier along with said flexible film cassette.

18. A method of providing a high spatial resolution and high contract resolution analog projection radiograph comprising the steps of:
   providing an X-ray grid and analog film X-ray detector at a relatively fixed position behind a patient;
   providing a fixed collimated X-ray source on a side of said patient opposing said X-ray grid and detector; and
   simultaneously moving said grid and detector in unison with said patient past said X-ray collimated source so that a high resolution analog radiograph is defined in said detector.

19. The method of claim 18 further comprising the step of curving said grid and analog detector to a predetermined radius of curvature focused on said collimated X-ray source to minimize lateral magnification.

20. The method of claim 18 wherein said step of providing said grid and detector and said collimated X-ray source are provided in a CT scanner having a moveable tabletop, said patient, grid and detector being disposed on said moveable tabletop and moved in unison therewith past said collimated X-ray source within said CT scanner.

* * * * *